United States Patent Office 2,788,315
Patented Apr. 9, 1957

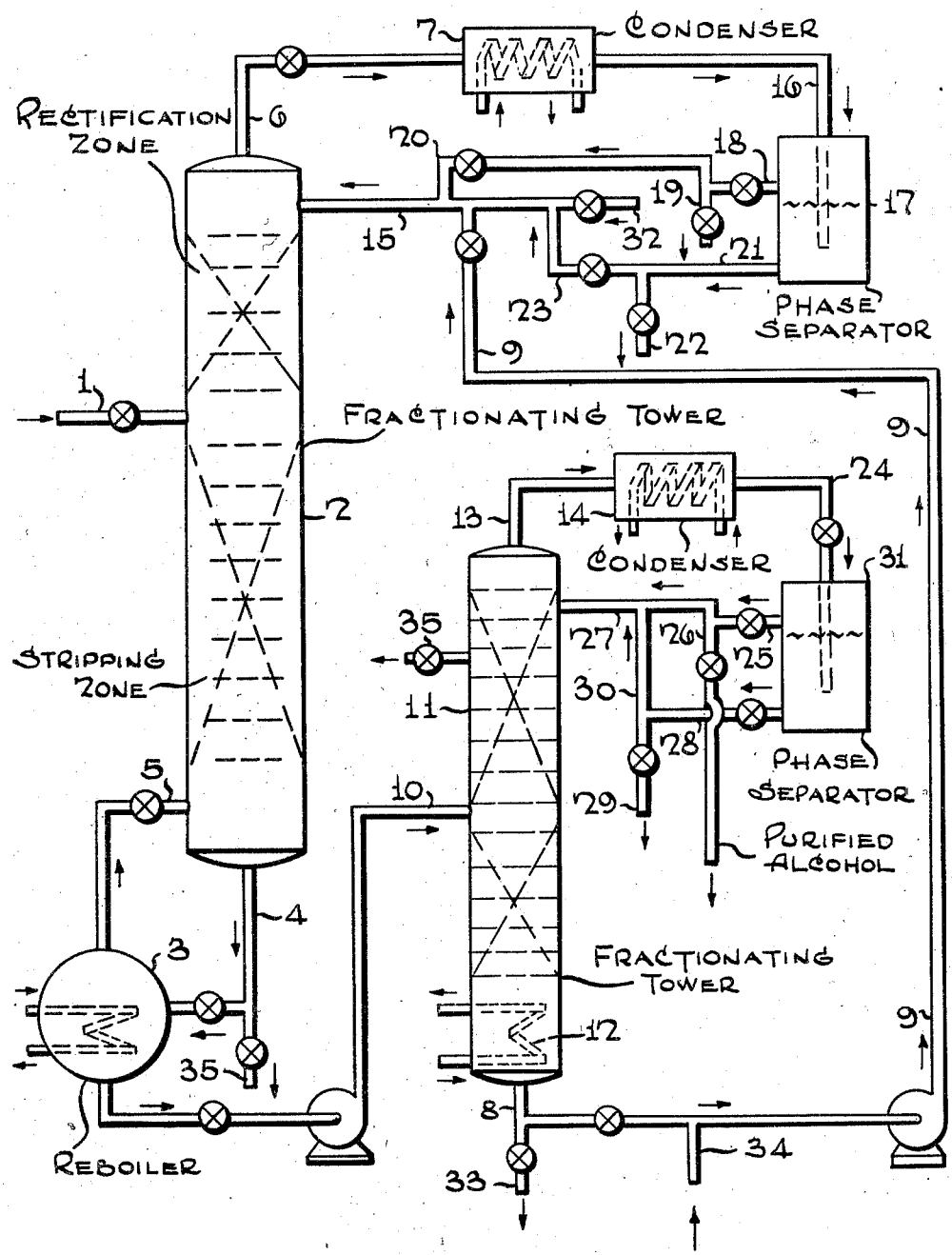

2,788,315

PURIFICATION OF $C_4$ TO $C_6$ ALCOHOLS BY EXTRACTIVE DISTILLATION

Charles E. Morrell, Westfield, Carl S. Carlson, Roselle, and Joseph Stewart, Cranford, N. J., assignors to Esso Research and Engineering Company, a corporation of Delaware Application December 4, 1952, Serial No. 324,112

7 Claims. (Cl. 202—39.5)

This invention relates to a method for the separation of oxygenated organic compounds with the use of hydrotropic organic solubilizers in aqueous solution by an extractive distillation procedure. It is particularly concerned with the separation of $C_4$ to $C_6$ Oxo alcohols from higher boiling hydrocarbon impurities.

This is a continuation-in-part of application Serial No. 160,118, filed May 5, 1950, now U. S. Patent 2,706,707, patented April 19, 1955, which describes the extractive distillation procedure for the separation between the oxygenated organic compounds having approximately the same molecular weights and boiling points. U. S. Patent 2,567,228 of Morrell et al. describes a procedure for separating between close-boiling hydrocarbons.

The purification of the $C_4$ to $C_6$ Oxo alcohols, and particularly of Oxo amyl alcohols, is different from the purification of other alcohols on account of the types and content of hydrocarbons in the azeotropes formed with these alcohols.

In the production of alcohols from olefins, carbon monoxide and hydrogen by the Oxo reaction, hydrocarbons of higher molecular weight than the starting olefin are formed as byproducts. These by-product hydrocarbons may result from olefin polymerization, or reaction and reduction of intermediate reaction products. For example, in the synthesis of amyl alcohols from butene-1 and butene-2 by the Oxo reaction, the following by-product hydrocarbons have been identified: 4 methyl nonane, and 3,5-dimethyl octane. The presence of these hydrocarbons poses a difficult purification problem, since they azeotrope with the amyl alcohols produced in the reaction.

The formation of by-product hydrocarbons containing twice as many carbon atoms as the alcohol produced is a general reaction in Oxo synthesis. While this poses a general purification problem, the propanols which are water soluble can be purified by water extractive distillation. The primary alcohols containing 4 to 6 carbon atoms, however, have limited miscibility in water and form azeotropes with the by-product hydrocarbons. For example, butyl alcohol (iso-butanol) and by-product 8-carbon hydrocarbons form an azeotrope containing approximately 50 weight percent hydrocarbon. Amyl alcohol (2-methyl butanol) and by-product 10-carbon hydrocarbons form an azeotrope containing approximately 13 weight percent hydrocarbon. Normal hexyl alcohol and by-product 12-carbon hydrocarbons form an azeotrope containing approximately 1 weight percent hydrocarbon. The alcohols containing 7 or more carbon atoms do not azeotrope with the by-product hydrocarbons to any appreciable extent.

In accordance with the present invention, complete elimination of the hydrocarbon impurities from the $C_4$–$C_6$ Oxo alcohols is obtained by use of aqueous hydrotropic salt solutions to solubilize the impurities and the alcohols in the distillation zone.

Hydrotropic salts are a recognized type of water-soluble compounds which in aqueous solution cause greater solubility of substances insoluble or slightly soluble in pure water, as indicated by H. S. Booth et al. in "Hydrotropic Solubilities," Ind. and Eng. Chem., vol. 40, p. 1491 (August 1948). A number of salts have this desired effect, but salts of organic compounds containing an alkyl aryl group and a polar substituent such as a sulfonic acid radical which imparts water solubility are most practical on account of their stability and availability. Representative suitable hydrotropic salts are sodium xylene sulfonates, sodium p-cymene sulfonate, and other water-soluble alkali salts of phenyl sulfonic acids.

In general, the hydrotropic salts which qualify for the purpose of the present invention are those which are dissolved to the extent of 20–80 weight percent in water at 20° C. and effect solution of the $C_4$ to $C_6$ Oxo alcohols with their $C_8$ to $C_{12}$ hydrocarbon impurities in aqueous hydrotropic salt solutions containing one or more of such salts in a concentration of 20 weight percent or more, the salts being non-volatile and stable during the distillation.

The special problem with which the present invention is concerned is the purification of the slightly water-soluble $C_4$ to $C_6$ aliphatic alcohols or alkanols that are contaminated by aliphatic hydrocarbons mainly in the $C_8$ to $C_{12}$ range. It was found that such contaminated alcohols tend to be produced by Oxo synthesis from $C_3$ to $C_5$ olefins. In these products, the alcohols and hydrocarbon contaminants, which may be dimers or polymers of the Oxo synthesis feed olefins and reduction products, are present as a number of isomers, thus complicating the separation problem. Various azeotrope compositions are formed by these alcohols and hydrocarbons.

The process will be described with reference to the schematic flow plan in the drawing.

The impure $C_4$–$C_5$ Oxo alcohol which is contaminated by higher-boiling hydrocarbons that tend to normally azeotrope with alcohols is fed to the fractionating tower 2 at an intermediate inlet point from feed line 1. Tower 2 is provided with fractionating plates. The aqueous hydrotropic salt solution containing about 20 to 80 weight percent of the water-soluble salt, e. g., alkyl aryl sulfonate, is introduced into an upper part of column or tower 2 by inlet line 15 and preferably at a temperature close to the temperature of liquid on the plate receiving the stream from line 15.

A reboiler 3 with suitable heating means is used to provide continuous vapor reflux from the bottoms and heat to the lower part of tower 2 at temperatures of about 100°–110° C.

With a concentration of the aqueous hydrotropic salt solution maintained at between 40 and 100 mole percent in the liquid internal reflux flowing down through the tower, the volatilities of the hydrocarbon impurities are made adequately higher than the volatility of the alcohols so that an aqueous hydrocarbon-enriched vapor stream can be removed from the top of column 2, after fractionation in the rectification zone in the fractionating tower between the inlet 1 of the impure alcohol feed and inlet line 15 of the aqueous salt solution.

Usually and preferably the hydrotropic salt concentration in the aqueous solution supplied to the fractionating tower 2 is of the order of 40 to 70 weight percent and the solution is added at such a rate as to form a major portion of the internal reflux, i. e., about 60 to 90 mole percent thereof.

The overhead vapors are passed from the outlet line 6 through cooling condenser 7. The liquid condensate is passed by line 16 from condenser 7 to the decanter 17, in which is formed an upper organic layer of the hydrocarbon containing some of the distilled alcohol and a lower aqueous layer containing predominantly water with a small amount of the alcohol and any other water-soluble impurities dissolved therein.

A vapor stream leaving the top of column 2 to be removed through outlet line 6 has a temperature in the range of between about 92° to 100° C. under atmospheric pressure and when analyzed was found to contain 87.0 mole percent of water, 7.6 mole percent hydrocarbon, and 5.3 mole percent alcohol.

The upper organic phase is removed from the phase separator or decanter 17 by line 18; and at least a portion of the organic layer may be returned as reflux to fractionating tower 2 by lines 20 and 15. This upper organic phase consisted of 13.9 mole percent water, 50.6 mole percent hydrocarbon, and 35.4 mole percent alcohol. The remaining part of the upper organic layer is removed by line 19.

The lower aqueous layer is removed from phase separator 17 by line 21. Part of this aqueous phase may be returned to tower 2 by lines 23 and 15 as reflux. The remaining part may be removed by line 22. Water-soluble impurities are rejected through line 22. Makeup water or salt solution is added by line 32.

From the bottom of tower 2 is removed the residual aqueous salt solution containing the substantially purified alcohol. At least part of this residual solution may be recycled through the reboiler 3 to the bottom part of column 2 through the inlet line 5. Some bottoms may be drained through line 35.

Liquid samples from the bottoms product withdrawn through line 4 were analyzed and showed contents of 56.6 mole percent water, 4.9 mole percent salt, and 38.4 mole percent alcohols substantially free of hydrocarbon impurities.

Part of the solution removed at outlet line 4 is introduced through a pump in line 10 to an intermediate point of the stripping tower 11. Tower 11 is provided with suitable fractionating plates and suitable heating means 12 to maintain temperatures for stripping the alcohols from the aqueous hydrotropic salt solution. An aqueous fraction containing alcohol is removed from an upper part of the column by line 13, condensed in condenser 14, and sent by line 24 to receiver 31. A portion of the aqueous alcohol condensate which separates as an upper alcohol-rich layer may be returned as reflux from receiver 31 by lines 25 and 27 to the upper part of tower 11. A remaining portion of the aqueous alcohol distillate is withdrawn as purified alcohol product by line 26. Also, if desired, a side alcohol stream product may be withdrawn, e. g., by line 35.

A portion of the water-rich distillate may be refluxed by lines 28, 30, and 27, and the remainder may be withdrawn by line 29 or be added to the recirculated lean salt solution from line 8. The lean aqueous solution stripped of alcohols is taken from the bottom outlet 8 of the stripping tower 11, and, if desired, all or part of this lean aqueous solution may be recycled through lines 9 and 15 back to the upper part of tower 2. Some of the solvent may be rejected through line 33 and fresh solvent may be added through line 34.

The conditions of operating fractionating tower 2, which comprises an upper rectification zone and a lower stripping zone, are such that the equilibrium vapor temperature is of the order of 92° to 100° C. under a pressure of about 1 atmosphere. The distillation in tower 2 may be carried out at atmospheric or subatmospheric pressures. The use of superatmospheric pressures is advantageous in some cases in that it allows higher temperatures to be used to give higher solubilities of the organic compounds in the aqueous salt solution at increased capacity. Subatmospheric pressures permit lower operating temperatures.

In general, the content of the hydrotropic salt in the aqueous solution should be between 20 and 80 weight percent of the salt based on the salt and water components. With increased pressures the lower amount of salt is required. In the distillation tower where the hydrocarbons are separated from the alcohols, the water and salt solution should make up between 40 and 100 mole percent of the internal liquid reflux. The separation selectivity is increased with the concentration of the salt solution in the internal reflux, but the capacity of the tower is lowered.

The following specific examples demonstrate the invention, but are illustrative and are not intended to limit the scope of the invention.

*Example I*

Oxo amyl alcohol formed by the reaction of carbon monoxide and hydrogen with butylenes in the presence of a cobalt catalyst followed by hydrogenation of the crude Oxo aldehyde was given a careful distillation to remove impurities from the amyl alcohols, but it was found that the amyl alcohols remaining were contaminated by 6–7 volume percent of hydrocarbons. Analyses indicated that the hydrocarbon or hydrocarbons present azeotroped with the lower-boiling 2-methyl butyl alcohol isomer at temperatures of about 129° C. and could not be separated from the alcohol mixture by fractionation. The hydrocarbon content of this azeotrope was indicated to be 11 to 14 volume percent.

To segregate and identify the hydrocarbon, the Oxo alcohol contaminated by the hydrocarbon was subjected to extractive distillation in the presence of aqueous hydrotropic salt solution in an apparatus similar to that shown in the drawing.

A substantially pure hydrocarbon mixture was separated from the overhead distillate by washing 10 volume percent of the overhead distillate with aqueous sodium xylene sulfonate to remove residual alcohol therefrom, drying the hydrocarbon oil and redistillating the hydrocarbon oil. Analysis of the hydrocarbon fractions recovered indicated the presence of 4-methyl nonane and 3,5-dimethyl octane. The bromine number indicated close to 30% olefinic components present.

*Example II*

In one run using the extractive distillation technique with the aqueous hydrotropic salt solution, after rejection of 10% front ends from the extractive distillation column, the residual alcohol contained only 0.3 volume percent of hydrocarbon instead of the 6+ volume percent of hydrocarbon which it initially contained. This was accomplished in a thirty-plate column operated at 10/1 reflux with 74 mole percent of aqueous sodium xylene sulfonate solvent maintained in the internal reflux, said aqueous solvent containing 46 weight percent of sodium xylene sulfonate.

*Example III*

The water azeotrope distillation was carried out on an alcohol charge similar to that in Example II, but containing an equal amount of water. The distillation was carried out at 10/1 reflux of the oil phase. After rejection of 10% front ends from the azeotropic distillation column, the residual alcohol contained 2.2 volume percent hydrocarbon. This distillation was carried out in a thirty-plate column at 10/1 reflux of separated organic phase to the column with water recycle to the reboiler.

*Example IV*

An alcohol mixture containing 2000 parts Oxo amyl alcohol contaminated with 6.1 weight percent of $C_{10}$ hydrocarbon was extractively distilled with aqueous containing 30 weight percent sodium xylene sulfonates. The extractive distillation was carried out to take 10 volume percent of the organic matter overhead as distillate. The remaining 90 volume percent, when stripped from the solvent solution, was found by analysis to contain only 0.8% hydrocarbon.

Example V

Using the same proportions as shown in Example IV and the same kind of Oxo amyl alcohol feed but with 46 weight percent sodium xylene sulfonate in the water solution, the extractive distillation was operated with a lower amount of solvent in the internal reflux, the solvent being fed to the top plate to maintain a concentration of 73 mole percent instead of 96 mole percent in the liquid reflux. This time, after taking 10 volume percent overhead the remaining alcohol was recovered by distillation from the solvent. Analysis showed 0.6 volume percent hydrocarbon impurities. This illustrates that with increased concentration of the hydrotropic salt the same or better purification is obtained even when using a lowered proportion of the aqueous salt solvent in the liquid reflux.

A number of significant factors of the invention are summarized as follows.

The hydrotropic salts which are water-soluble salts of organic compounds containing an acid radical, preferably aromatic sulfonates, are capable of completely solubilizing the $C_4$ to $C_6$ alcohols and the $C_8$ to $C_{12}$ hydrocarbons in aqueous solutions of these salts at the distillation temperatures, i. e., 92° C. to about 110° C.

In fractionally distilling the $C_4$ to $C_6$ alcohols mixed with $C_8$ to $C_{12}$ hydrocarbons homogeneously dissolved in the aqueous solutions of the hydrotropic salts, ternary hydrocarbons-alcohol-water azeotropes containing considerably higher proportions of the hydrocarbons to alcohol than binary azeotropes of the hydrocarbons and alcohol are formed. This can account for the more effective separation of the hydrocarbons by the present method.

In distilling the ternary hydrocarbon-alcohol-water azeotropes from the homogeneous aqueous hydrotropic salt solutions of the alcohols and the hydrocarbons, considerably lower temperatures are used (92° to 110° C. as determined at 1 atm.) compared to the higher boiling temperatures of the alcohol and hydrocarbon binary azeotropes (125° to 135° C.). This can account for a gain in efficiency with the present method.

By the terms "extractive distillation" or "extractively distilling" is meant a procedure of supplying and flowing the aqueous hydrotropic salt solution countercurrent to vapors being distilled from the hydrocarbon contaminated alcohol feed so that the aqueous solution becomes homogeneously mixed with fractional condensate from the vapors as they undergo fractionation. However, the present process is distinctive in the formation of its overhead or distillate product containing the hydrocarbon, alcohol, and water components as described.

The invention described is claimed as follows:

1. A process for the separation of a slightly water-soluble relatively low boiling $C_4$ to $C_6$ primary aliphatic alcohol from a mixture containing a relatively high boiling $C_8$ to $C_{12}$ hydrocarbon which tends to azeotrope with the alcohol, which comprises subjecting the mixture to an extractive distillation using as the extraction solvent an aqueous solution of a water-soluble hydrotropic alkali phenyl sulfonate present in said solution in an amount of 20 to 80 weight percent whereby the alcohol and the hydrocarbons are dissolved in the solution and the hydrocarbons are rendered more volatile than the alcohol, and the hydrocarbons which are thus rendered relatively more volatile are separated from the now relatively less volatile alcohol by vaporization, the aqueous solution of the hydrotropic sulfonate being added to the extractive distillation so as to form about 60 to 90 mole percent of internal reflux.

2. A process for purifying a relatively low boiling $C_4$ to $C_6$ aliphatic Oxo alcohol which is contaminated by a substantial amount of relatively high boiling olefinic and paraffinic hydrocarbons containing twice as many carbon atoms per molecule as the alcohol, which comprises subjecting the mixture of the alcohol and hydrocarbon contaminants to an extractive distillation in an extractive distillation zone using as the extraction solvent an aqueous solution which contains 20 to 80 weight percent of a water-soluble hydrotropic sodium phenyl sulfonate, whereby the hydrocarbons are rendered relatively more volatile than the alcohol, supplying a sufficient amount of said extraction solvent to said zone to dissolve the alcohol and hydrocarbon impurities therein and to form between 40 and 100 mole per cent of internal reflux in said zone, maintaining temperatures in said zone to distill from said zone a mixture of the now relatively more volatile hydrocarbon impurities with a substantial amount of the water and of the alcohol, and recovering from said zone an undistilled residual portion of the extraction solvent comprising a dilute aqueous solution of the now relatively less volatile alcohol substantially freed of the said hydrocarbon impurities.

3. A process for purifying a slightly water-soluble, relatively low boiling, primary aliphatic $C_4$ to $C_6$ alcohol contaminated by a relatively high boiling hydrocarbon possessing twice as many carbon atoms per molecule as the alcohol, which comprises extractively distilling in a fractional distillation zone an aqueous azeotrope containing a larger proportion of the hydrocarbon than of the alcohol from a homogeneous solution of the alcohol and hydrocarbon in an aqueous solution containing dissolved therein a sodium alkyl phenyl sulfonate in a concentration of 40 to 70 weight percent, whereby the hydrocarbons are rendered relatively more volatile and are separated as a vapor fraction while the alcohols are rendered relatively less volatile and are withdrawn from the distillation zone as a substantially hydrocarbon-free aqueous residue, the aqueous solution being added to an upper portion of said fractional distillation zone at such a rate as to form about 60 to 90 mole percent of the internal reflux.

4. A process as defined in claim 3, wherein the alcohol is a $C_5$ alcohol, the hydrocarbon is a $C_{10}$ compound and the salt is sodium xylene sulfonate.

5. A process as defined in claim 3, wherein the salt is sodium para cymene sulfonate.

6. A process as defined in claim 3, wherein the aqueous sulfonate salt solution constitutes a major proportion of the homogeneous solution of alcohol and hydrocarbon material being distilled.

7. A process as defined in claim 3, wherein the aqueous azeotrope of the hydrocarbon, alcohol, and water is distilled from the homogeneous solution at temperatures in the range of about 92° C. to 110° C. under atmospheric pressure.

References Cited in the file of this patent

UNITED STATES PATENTS

| | | |
|---|---|---|
| 1,932,903 | McKee | Oct. 31, 1933 |
| 2,164,587 | McKee et al. | July 4, 1939 |
| 2,551,593 | Gilliland et al. | May 8, 1951 |
| 2,612,468 | Morrell et al. | Sept. 30, 1952 |
| 2,614,970 | Morrell et al. | Oct. 21, 1952 |
| 2,706,707 | Morrell et al. | Apr. 19, 1955 |

OTHER REFERENCES

Booth et al.: Industrial and Engineering Chemistry, August 1940, vol. 40, pages 1491–1493, "Hydrotropic Solubilities."